May 3, 1960  G. DEDE  2,935,139
TRACTOR PROPELLED POWER DRIVEN ROTARY CULTIVATING DEVICE
Filed March 11, 1957  3 Sheets-Sheet 1
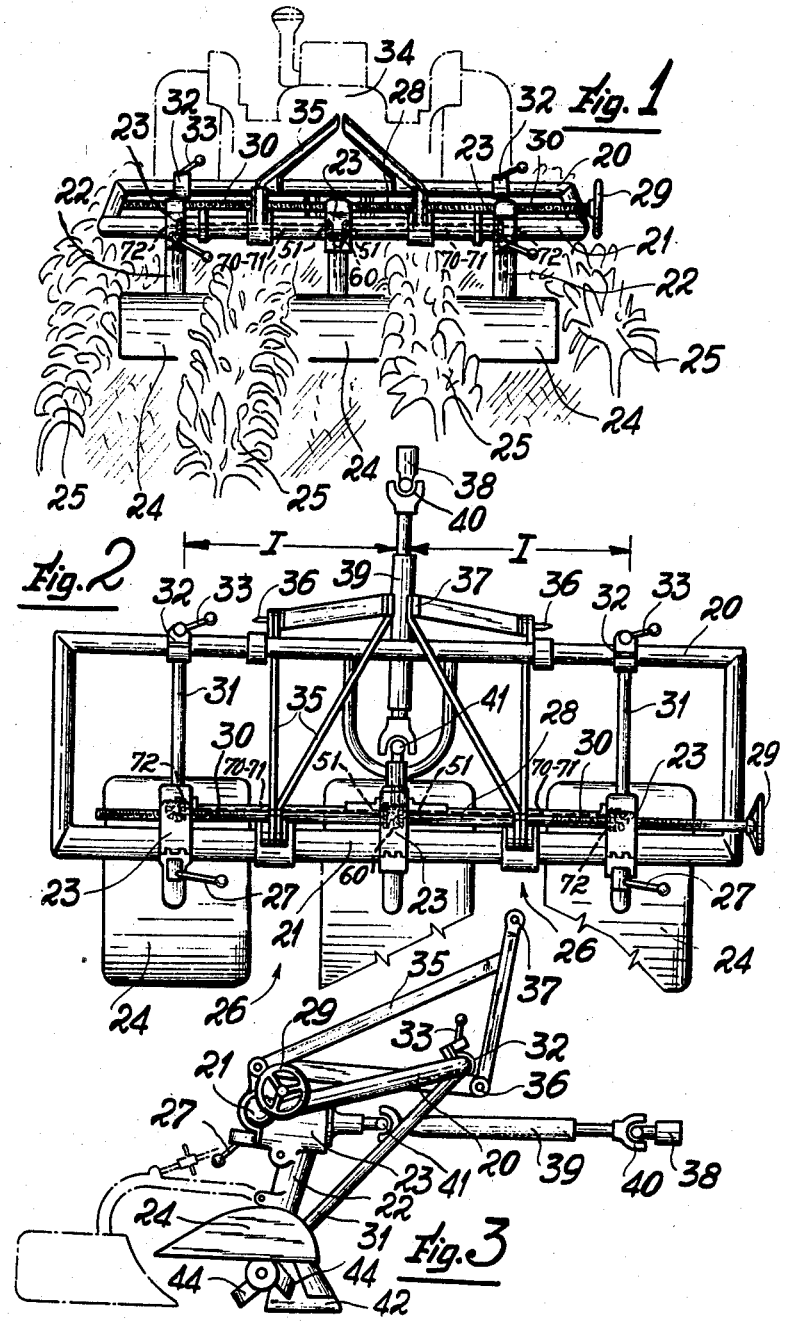

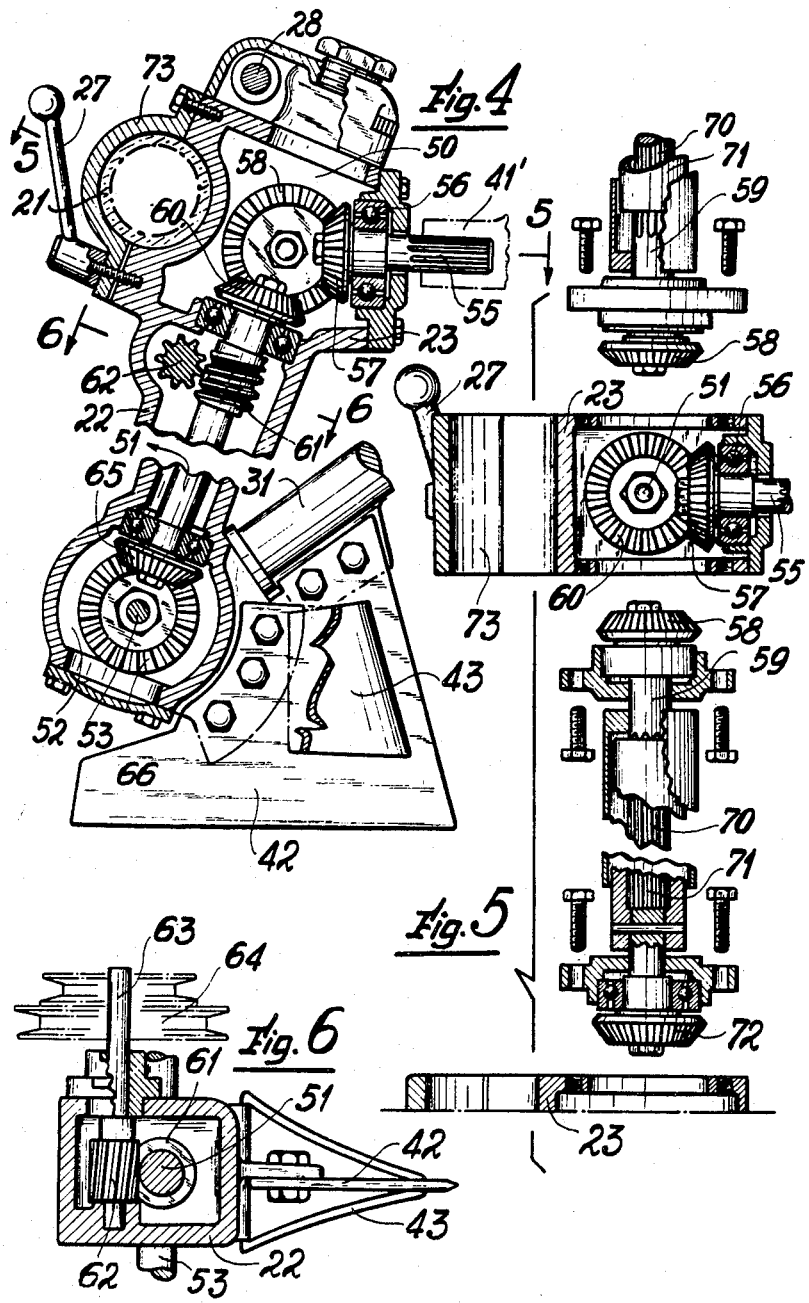

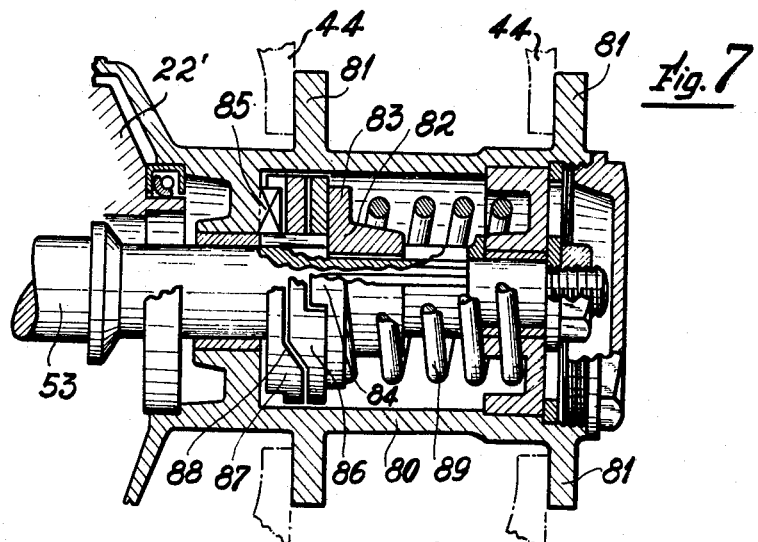
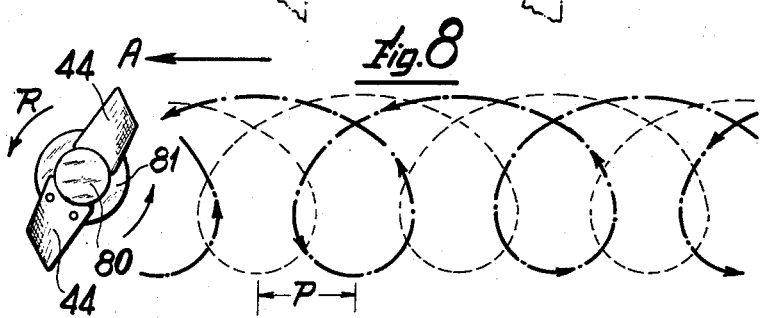
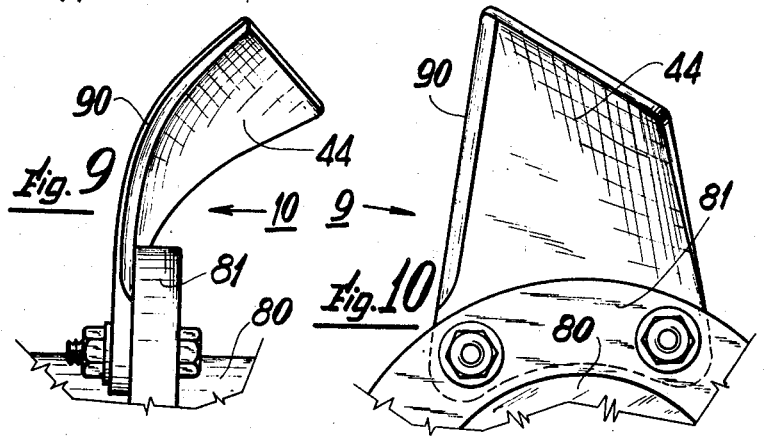

United States Patent Office 2,935,139
Patented May 3, 1960

2,935,139

TRACTOR PROPELLED POWER DRIVEN ROTARY CULTIVATING DEVICE

Giuseppe Dede, Redavalle, Italy

Application March 11, 1957, Serial No. 645,136

Claims priority, application Italy March 10, 1956

15 Claims. (Cl. 172—60)

This invention relates to improvements in earth cultivating devices having power driven rotary tools, and more particularly it is related to the type of cultivating machines adapted for use with a farm tractor having hitching means suitable for supporting said machine in various fixed positions relative thereto and having power take-off means suitable for driving the mechanisms and tools of the attached farm device towed thereby.

The general object of this invention is to provide a new and improved farm cultivating device which may be operated in combination with a conventional farm tractor of the type having a so called "three-point" implement lift mechanisms, and wherein a frame structure adapted for attachment with said lift mechanism is combined with a plurality of downwardly extending working units spaced substantially from each other to provide vertically extending free spaces therebetween and each rotatably supporting rotary tools at the lower ends thereof and adapted to earth treating along a corresponding plurality of ground strips comprising untreated spaces therebetween wherein growing crops may be located, so that the device of the invention may be advantageously adapted to be drawn over parallel rows of grown vegetables for weeding between the same, said vegetables passing uninjured beneath the device through the said free spaces.

Another important object of this invention is to provide a new and advantageous farm cultivating device designed for earth treatment simultaneously on a plurality of spaced strips of ground located between parallel rows of grown vegetables and comprising a plurality of working units spaced substantially from each other and movably connected to a frame structure means for adjustment of the spacings existing between said units for adaptation of the device to soil tilling between differingly spaced parallel rows of crops.

A further important object of this invention is to provide a new and advantageous farm cultivating device of the type referred to above, having a plurality of adjustably spaced downwardly extended working units each supporting rotary tools drivingly connected to transmission means adapted for connection to the farm tractor power take-off means, wherein the said transmission means comprises elongatable transmission shafts adapted to drivingly connect said variably positioned units to said power take-off means at any differing possible spaced relationship of said units.

A still other object of this invention is to provide a new and useful multi-units earth cultivating device of the type described, which is not subject to the objection, common to the several big cultivators or large soil tillers designed for connection to a farm tractor, of the requirement of personnel other than the tractor's driver for guiding the cultivator on the track and for minimizing the deleterious effects of side thrusts on laterally extended soil treating devices.

It is known tho those skilled in the art to which this invention appertains that a number of big multi-tools soil rotary tillers has heretofore been proposed and experienced, i.e. of cultivating machines theoretically designed for simultaneously operating on a pretty large, say a 6 ft. wide of 8 ft. or more wide strip of ground and to be towed and operated by a conventional farm tractor. One of the factors which have prevented any effective and positive operation of such big machines on the field has been proved to be the poor ability of the machine to satisfyingly track behind the tractor and to be subject to severe side thrusts as any of the sidely located rotary tool interferes with a hard portion, say a stone or a root, of the ground. Such objection is considered a very serious drawback of such machines in general and it completely prevents any possible practical use thereof in soil tilling between rows of crops, because any side movement of the machine in respect to the tractor direction would cause the damage and often the destruction of the neighbouring vegetables.

It is therefore a specific object of this invention to provide a new and improved farm cultivating device of the above character, which may effectively track behind the tractor and which consequently is positive in operation, provided with earth cutting fin means associated to the working units thereof, said fin means being located and dimensioned to operate on the portion of ground which is not yet been loosened by the action of the machine's rotary tools and to positively resist to said side thrusts.

A still further object of this invention is to provide a new and useful cultivating device as above, having a plurality of rotary tools carrying downwardly extended working units movably connected to a transversely arranged frame means and adapted to be fixedly connected thereto at a plurality of differingly spaced relative positions for adjustment of the farm machine of the invention to operate between differingly spaced parallel rows of vegetables, and comprising adjusting means connected to said frame means and to said units, designed for readily moving said units in respect to said frame.

A further object of the invention is to provide, in an adjustable multi-units farm cultivating device as above, adjusting means designed for symmetrically moving said units in respect to the longitudinal plane of symmetry of the machine and for keeping the said units at like intervals from each other during the movements thereof in respect to the frame.

According to a preferred embodiment of the cultivating device of the invention, the said adjusting means are provided with hand-wheel control means for operation thereof and further the said movable units are provided with hand-operatable locking means to fixedly lock said units to said frame structure at any location at which said units may be set upon operation of said adjusting means. Consequently, the provision of said hand-operatable adjusting and locking means makes the improved machine of the invention adapted to adjustment, on the very field, of the spacing of the working units thereof to the spacings of the parallel rows of crops of the very field on which the machine is to be utilized.

Another object of this invention is to provide a new and improved multi-units machine of the character described and including transmission means to drivingly connect the tractor's power take-off means to a plurality of rotary tools or, preferably, to a plurality of groups of rotary tools paired at the lower end portion of each working unit, the said transmission means comprising torque shock-absorbing means connected between each rotary tool or group of rotary tools and the remaining elements included in the transmission, the said torque-absorbing means being further adapted to drivingly transmit the rotary motion up to a given torque value only, so that in the occurrence that one or more groups encounter a resistance greater than said given value, due say to a rock, or a hard root in the ground, both the tool impacting on the rock and the said remaining part of the transmission are protected against heavy stresses while the remaining groups of the machine are not prejudiced in their continuous rotary motion.

A further object of this invention is the provision of a new and improved construction of a big soil cultivating device of the type referred to above, wherein the several working units and the most of the drive transmitting members thereof are so constructed as standard shaped and manufactured elements that the whole device may therefore be made economical to manufacture and assemble, and readily controlled and repaired by having relatively few spare parts at disposal as compared with the relatively high number of members effectively comprised in the mechanism thereof.

In particular, the said object of this invention is to provide a new cultivating device of the above type, including a very simple frame means which may be economically manufactured by welding together lengths of tubular elements and a plurality of likely constructed working units, each of said units including an elongated casing having a head portion adapted for movable connection of the unit to said frame means, a downwardly extended middle portion and a lower portion, a middle shaft rotatably supported in said middle portion and having upper and lower ends in said head and respectively in said lower portions, a rotary tool bearing horizontal shaft rotatably supported in said lower portions and extended outer both side faces thereof, bevel gear means in said lower portion to drivingly connect said middle shaft to said tool bearing shaft, seating means in both side faces and in front face of said head portion, designed for mounting therein bearing means adapted to rotatably support drive shafts extended sidewardly and respectively frontwardly outside said faces, and bevel gear means in said head portions to drivingly connect said middle shaft to said drive shafts, so that by making use of such elements whatsoever working unit of an improved tilling machine according to the invention and having any desired number of units may be easily constructed, by making use of a relatively small number of types of standard manufactured elements.

In particular, to produce a three-unit cultivating device, a central working unit may be assembled including transmission means adapted to drivingly connect the unit to the tractor power take-off, by means of the said frontwardly extended drive shaft, while the two side units may be connected to said central unit by means of said sidewardly extended shafts. A say five-unit cultivator may be likewise produced by correspondingly constructing the central unit and the outer side units, while the inner side units are drivingly connected to both adjacent outer and central units by means of said shafts.

Other objects and advantages of the invention are in part obvious and in part will become apparent as this description proceeds, and the features which are considered as characteristics of the invention will be in particular set forth in the appended claims. The invention itself, also, both as to its construction and to its operation, will become best apparent from the following detailed description of a preferred form of embodiment thereof, when taken in conjunction with the accompanying drawings, forming an essential component of this specification.

In the drawings:

Figure 1 illustrates, in a somewhat simplified way and in rear view, a form of embodiment of the cultivating device of the invention, including three symmetrically arranged working units and freely tracking behind a farm tractor in a field wherein vegetables are grown up in parallel rows;

Figure 2 is a view from above of the device of the invention, part of certain minor details thereof being broken away;

Figure 3 is a side view of the form of embodiment of Fig. 2, illustrated in a somewhat simplified way too;

Figure 4 is a vertical longitudinal sectional view of the centrally located working unit of the said form of embodiment of the invention, the middle portion of said unit being broken away in the drawing;

Figure 5 is an exploded view including the head portion of the unit of Fig. 4, in horizontal sectional view on the line 5—5 of said Fig. 4, and a part of the elements comprised in the transmission means connected thereto;

Figure 6 is a cross-sectional view of the lower portion of same unit, taken on line 6—6 of Fig. 4;

Figure 7 is a longitudinal sectional view of the hub portion of one of the groups of rotary tools of the device, and including a preferred embodiment of the torque-limiting and shock-absorber mechanism;

Figure 8 is a graph diagrammatically showing the mode of operation of the tools of the cultivating device of the invention;

Figure 9 is a front view of a preferred form of one rotary tool particularly designed for operation in combination with the cultivator of the invention for having the best performance of the features thereof, and shown in direction of the arrow 9 of Figure 10, wherein same tool is shown in direction 10 of Fig. 9.

Referring first to Figs. 1 to 3 inclusive:

In general, the cultivating device of the invention may be considered as an improvement of the machine described in my prior application Serial No. 435,272, filed June 8, 1954, now abandoned, which has been proved not satisfyingly and the extensive experimentation thereof on the field and in differing conditions of ground and of operation demonstrated the various drawbacks and objections overcame by the features of the invention.

The improved machine includes a substantially rectangular and nearly horizontal frame structure formed by a front tubular cross bar 20 and by a rear tubular cross bar 21 having its end portions connected to the corresponding end portion of front bar by side bars, welded at 90° to said cross bars.

At spaced points in the length of said rear cross bar 21 the head portions 23 of downwardly extended working units 22 are movably connected at like intervals I from each other and each supporting one pair of groups of rotary tools at their lower end portions, said tools being normally covered and protected by covers 24.

In view of operation between parallel rows of vegetables 25 (Fig. 1), free spaces 26 (Fig. 2) are provided between said covers 24, each of which protects a pair of symmetrically arranged groups of rotary tools 44 (Fig. 3) borne and driven by the respective working unit. No structural or transmission means is located in said free spaces defined by said covers 24, said units 22 and said cross bar 21, so that the said grown crops 25 are not damaged by the passage and the operation of the machine, provided that such machine may exactly track behind the tractor 34 (Fig. 1) to which the device is connected.

The said head portions 23 of the side units are movably connected to said cross-bar 21 by means of locking means adapted to be loosened by operating suitable handle means, say handles 27, and adjusting means are provided for symmetrically moving said side units along said cross bar. For example, a threaded bar 28 (Figs. 1 and 2) connected to a hand-wheel 29 is rotatably supported near by and parallel to said cross bar 21, and it is provided with threaded portions 30, of opposite helical direction and of like pitch, threadedly connected to said side working units, so that, upon loosening of said locking means and rotating the said hand-wheel 29 the said working units may be symmetrically and oppositely moved in respect to the central unit to positively adapt the interval I between the unit to the interval between the parallel rows of crops 25 grown in the field on which the machine is being operated.

The downwardly directed arrangement of the several working units 22 of the device is secured by means of inclined braces 31 (Figs. 2 and 3) having its lower end fixedly connected to the lower end portion of the respective unit 22 and its upper end movably connected to said front cross bar 20 by means of locking means 32 which may be loosened and tightened by operating handles 33, for having said braces 31 movable along said cross bar 20 while the respectively braced unit 22 is moved along the cross bar 21.

The cultivating device of the invention is designed for attachment to the rear of a conventional farm tractor 34 (Fig. 1) provided with a so called "three-point" lift implement mechanism (not shown) of the type well known to those skilled in the art to which this invention appertains and used, for example, to lift a plowing apparatus connected behind the tractor. For attachment of the machine of the invention to said lift implement, said machine is provided with a nearly pyramidal structure 35 converging at 37 for attachment to the upper point of said lift implement and with pins 36 for attachment to the two lower side points of same implement.

In Figs. 2 and 3 numeral 38 indicates a conventional tubular connecting means adapted for connection with the tractor's power take-off. Said connecting means 38 is drivingly connected to the mechanism housed within the head portion of the central working unit by means of a conventional axially extensible drive shaft 39 and of a pair of likewise conventionally constructed universal joint means 40 and 41.

A surprising improvement in the performance and in the effective operation of the device on the field has been experienced upon the provision of fin plate members 42 (Fig. 3) fixedly connected to the lower end portion of at least one and preferably of any working unit 22, provided that such fin members are located to cut into the ground not yet loosened by the operation of rotary tools 44. Therefore said fins 42 are arranged to have a portion of their side surface ahead of the space wherein said tools 44 rotate.

In Figs. 1 to 3 the machine of the invention has been shown in a somewhat simplified way. In Figs. 4 to 6 the various features which have been proved as necessary for actually and positively performing the invention are shown in greater detail, certain minor features, however, being omitted for simplicity sake, upon the consideration that such minor features are to be considered within the expected skill of the art to which this invention appertains. Further, a part only of the various elements of the new and advantageous features of the invention are shown in detail, considering that the said remaining elements may be considered as essentially like the ones shown and described as this description proceeds, and therefore such remaining elements may be easily conceived and produced upon the teaching had from the ones. Still further, some minor details of the construction will be obvious to those skilled in the art from a consideration of the accompanying drawings and therefore such details of construction will not be recited in this disclosure of which said drawings are a directly readable component.

In Figs. 4 to 6 the central working unit of the three units 22 of the machine of Figs. 1 to 3 is shown. Said unit 22 comprises an elongated casing, say of cast, including a head portion 23 having a front face and two parallel side faces confining a chamber 50 therein, an elongated hollow downwardly directed middle portion and a lower portion having two parallel side faces and confining a lower chamber 52 therein. In Fig. 4 the said middle portion has a central part broken away.

Inside the said middle hollow portion a middle shaft 51 is rotatably supported, say by means of ball-bearings, as shown, and having upper and lower end portions extended within said chamber 50 and said chamber 52, respectively. Within the said lower portion a rotary tool bearing shaft 53 is horizontally arranged and rotatably supported through said chamber 52 and having end portions (one of which is shown in Fig. 7) extended outside the said side faces thereof. As particularly shown in Fig. 4, the said lower portion of the unit 22 and of its brace member 31 are provided with forwardly and respectively downwardly directed flat extensions to support the said stabilizing fin member 42, which at its turn supports a V-shaped pair of ground diverters 43 adapted to cause a groove in the earth for free passage of said lower portion of the unit.

As shown in Figs. 4 and 5, the front face of said head portion 23 of unit is formed by a removable plate cover member having a passage therein and adapted to support bearing means, say a ball-bearing 56 designed to rotatably support a front drive shaft 55 passing through said passage, having an outer end portion adapted for connection with the coupling portion 41' (Fig. 4) of the universal joint 41 of Figs. 2 and 3, and an inner end portion connected to a bevel gear 57.

Said bevel gear is arranged in said chamber 50 in meshing relationship with two other symmetrically supported bevel gears 58 connected to the inner ends of side drive shaft 59 rotatably supported through and by other bearing means seated in other removable cover members forming the said side faces of said head portion 23 of the unit, and with a fourth bevel gear 60 connected to the upper end portion of said middle shaft 51, so that the drive rotary motion received from the tractor's power take-off (through the elements 38, 39, 40 and 41 of Figs. 2 and 3) may be transmitted both to said side drive shafts 59 and to the rotary tools bearing shaft 53, through said middle shaft 51 and other bevel gears 65 and 66.

Preferably, the said middle shaft 51 is further connected to or made integral with a worm gear 61 (Figs. 4 and 6) in meshing relationship with a helical gear 62 connected to or made integral with an auxiliary shaft 63 (Fig. 6) rotatably supported by and extending outside one side face of the elongated middle portion of unit 22, preferably just beneath the head portion 23 thereof. Such auxiliary shaft 63 is horizontally and transversely located in said unit and its outer portion is designed for use as a power take-off means adapted to drive any suitable agricultural device, e.g. a sowing-machine, which might advantageously be coupled to the various units of the device of the invention. For example, as shown in Fig. 6, a belt driving pulley 64, as drawn in dot-and-dash lines, may be connected to said outer portion of said auxiliary shaft 63.

As above described with reference to Figs. 1 to 3 of the accompanying drawings, the various working units of the cultivating device of the invention are connected to the frame structure thereof for relative movement for adjusting purposes. The driving connection between the various units is therefore designed such to allow said relative movements, in particular the displacement of lateral units in respect to the central one.

As shown in the exploded view of Fig. 5, the side drive shafts 59 laterally extended outside the head portion 23 of the unit include outer extended portions 70 provided with longitudinal grooves on the surfaces thereof, adapted for rotary but not axial connection with an inside correspondingly grooved tubular member 71 connected to the side drive shafts of the adjacent working units of same machine. In Fig. 5, reference numeral 72 indicates one bevel gear which fully corresponds both in manufacture, assembling and operation, to any of side bevel gears 58 of the described unit, and which is supposed to belong to the side working unit positioned at the right side of the machine.

From that above and by a consideration of the accompanying drawings it might be readily understood that the above described construction of the central unit of the machine may fully correspond to the construction of any of the other units of the machine, upon suitable omission of certain elements.

For example, to actuate the lateral or side units of a three-unit machine as shown in Figs. 1 and 2, the units are constructed omitting the front drive shaft 55, the relative bevel gear 57, the bearing 56, and one of the side shafts 59 and its relative bevel gear 58 (on the side opposite to the central unit). The cover members of front face and of said one side are substituted by simple closure disk-like members. If a five-unit machine is produced, for example, the central and the external side units are constructed as above said, and the inner side units are provided with both side shafts 59 and their relative bevel gears 58. The drive is therefore transmitted from the central unit to the external side units through the mechanism of the inner side units.

Preferably, the machines produced according to the invention are constructed to operate on three or on five strips of earth, according to the power of the tractor and to the type of ground. Five-unit machines have been very successfully proved on fields of differing ground characteristics, and such machines have further been proved capable of perfectly tracking behind a tractor the wheels or caterpillars which track on the ground strips on which the two inner side units would operate.

The working units of the machine of the invention are provided with an hemi-cylindrical seat forming hollow on the rear face of the head portion 23 thereof, as shown in Fig. 4, for seating of the tubular rear cross-bar 21 of the frame structure (Figs. 1 to 3), co-operating with oppositely shaped and located hemi-cylindrical member 73 which may be tightened against the said cross-bar 21 (shown in dot-and-dash lines in Fig. 4) seated into said hollow, for removably locking the unit to said cross-bar.

In Fig. 4, the described central unit of the machine is shown as provided with the said handle means 27 to lock the same unit. In the practical embodiment of the invention, said central unit may advantageously be locked by securing said member 73 with conventional bolts, considering that such unit is supposed to be kept at any time at midway of the said cross-bar, while the handle means 27 shown is preferably applied to the lateral units of same machine, i.e. to the units that require displacement thereof along the cross-bar, for the described adjusting purposes. The locking means 32 of Figs. 1 to 3, designed for movable connection of the inclined braces 31 to the front cross-bar 20 of the frame structure may correspond to the described locking means 73, both as to its construction and to its mode of operation.

A very important feature of the invention, which has been proved as essential for the practical embodiment and use thereof in the field, consists in the provision of torque-limiting and shock-absorbing means between the transmission means of the machine and any single group of rotary tools thereof. In fact, a three-unit or five-unit big cultivating device, produced according to the invention, consequently provided with six or respectively ten groups of rotary tools, simultaneously operating on a remarkably wide portion of ground, necessarily require a remarkable amount of power to simultaneously drive all tools, such amount being theoretically distributed among the various operating groups.

In actual operation of the machine, it often occurs that one rotating tool may impact on some resisting body, say a rock or a very hard root, which cannot be overcome by the tool. In such occurrence, if no safety devices are provided, the tool ordinarily breaks, owing to the facts that the body cannot be cut or torn up by the tool, that the whole power is applied to the impacting tool, and that such tool and the whole mechanism of the machine could obviously not be made such to resist to the stresses resulting from an abrupt stopping of the machine and of the motor of tractor too. Breakage of single tools is the most frequent event in operation of rotary tilling machine of small size too, as well known in the art.

In Fig. 7 the preferred construction of such shock-absorbing and torque-limiting safety device is shown. Numeral 22' indicates one side face of the lower portion of one working unit, from which an end portion of the rotary tools 44 bearing shaft 53 extends. The group of tools includes a tubular hub member 80 provided with out-facing annular flange forming extensions 81 designed for supporting the various tools 44, as shown in Figs. 9 and 10. In the form of embodiment shown, the said hub member 80 is provided with two spaced flanges 81, but it may be provided with three or more flanges, according to the type of tilling required, say for having the ground more finely ruptured.

By means of a conventional groove-and-rib connection, a tubular member 82 having a flange portion 83 is rotatively connected and axially slidable about and respectively along the portion of shaft 53 located inside said hub member. A diametrally arranged rib 84 is provided on a flat face of said flange portion 83 of member 82 and a correspondingly shaped diametrally arranged rib 85 is arranged on an in-facing flange portion made integral with said hub member 80. Two shaped disk-like coupling members 86 and 87 are located between said flange portions of hub and of said member 82. Said coupling members 86 and 87 are identical, oppositely arranged and at 90° from each other. Said members include an outer face (in respect each to other) having a diametral groove adapted for slidably seating said ribs 84 and respectively 85 and an inner face, adapted for relative abutment, having hollow sectors confined by helically inclined surfaces 88. Spring means, for example a coil spring 89, urges said member 82 towards the said in-facing flange of hub and, therefore, the said coupling members 86 and 87 against each other.

Through said member 82 coupling member 86 is rotatably connected to shaft 53 and said member 87 is rotatably connected to the hub, by means of said rib 85. Consequently the hub is caused to rotate together with the shaft until the transmitted torque is limited to the value at which the spring 89 may prevent the relative sliding and climbing of inclined surfaces 88. In the event of impact of any rotary tool against hard bodies on the ground, the tool group including impacting tool is temporarily arrested, while the other groups of the machine continuously operate, until the obstacle is passed over.

The provision of the described connection of said coupling members to the driving and driven relative elements of the group, by means of diametral ribs 84 and respectively 85 at 90° each to other allows the free self-centering of the coupling assembly. Further, the said coupling members 86 and 87 may be readily and economically substituted when worn out.

By the provision of efficient torque-limiting devices between the operating members of the machine, i.e. the rotary groups thereof and the transmission, it has surprisingly found that a very great improvement in the actual treatment of the ground may be attained, as a result of the fact that the various groups may be driven by applying a torque thereto of value near to the very highest value which the tools may afford. In the prior machines, wherein the rotary tools cannot normally operate as above, it was customary to have the machine traveling on the ground at a very little linear speed, so that the rotating tools could cut into the ground at very closely spaced successive points, in an attempt to avoid the possible impact of the tools on not previously disrooted obstacles.

Such condition is to be considered as being a very serious drawback in the operation of such machines, both in view of the poor ratio labour-hours/treated-surface, and in view of the excessive pulverization of the ground, which may successively became impervious to oxygen when wetted by rain or by irrigation, when too finely subdivided.

A machine constructed according to the invention and provided with efficient rigid rotary tools, as shown in Figs. 9 and 10, having a bowed cutting edge 90 and an helically bent surface, has been proved capable to very sucessfully operate in working conditions as diagrammatically shown in Fig. 8. In said Fig. 8, arrows R indicate the direction of rotation of the tools 44 and A the direction of the movement of the machine behind the tractor. Reference P indicates the "pitch" of the motion of the tools in respect to the ground. Provided that the rotary tools are driven at a very safe rotational speed, say at 300 r.p.m., the tractor may safety tow the machine at 4 or even at 5 m.p.h. to produce an esteemed treatment of the ground on a very wide strip of cultivation in a surprisingly little time.

The rotating tools may safely afford the hard stresses involved in cutting the ground according a cycle the pitch of which is of the order of 5 to 8 inches, when protected by the described torque-limiting device.

It is believed to be evident that the present invention includes various new and advantageous features, in particular a new cultivating machine capable of a very large farm production, and to operate between parallel rows of well grown crops, without prejudice for the vegetables, as well as new and useful means designed to overcome the most common and serious drawbacks of the machines heretofore proposed. It will be understood too that each of the new features described above or any combination thereof may also find a useful application in other types of ground treating apparatuses differing from the one described.

Without further analysis, the foregoing will so fully reveal the gist of this invention that others can, by applying current knowledge, readily adapt it for various applications without omitting features that, from the standpoint of prior art, fairly constitute essential characteristics of this invention and, therefore, such adaptations should and are intended to be comprehended within the spirit and meaning of equivalents of the invention, as defined in and by the appended claims.

Having thus described the invention, what I claim as new and desire to have protected by Letters Patent is:

1. A farm cultivating device of the type described, comprising, in combination, a frame structure having attachment means to removably connect said frame structure to a farm tractor of the type including a three-point lift implement and a power take-off, said frame structure consisting in a front cross-bar horizontally suspended and transversely arranged in respect to direction of travel, in a rear cross-bar spaced from and parallel to said front cross-bar, in side bars connected to said cross-bars at the ends thereof, and in a substantially pyramidal structure connected to said cross-bars and supporting said attachment means; a plurality of elongated and downwardly directed working units including a central unit and side units, evenly spaced along said rear cross-bar and defining vertically extended spaces therebetween and beneath said rear cross-bar, each of said units comprising a hollow head portion adapted for connection to said rear cross-bar and for displacement therealong, an elongated hollow downwardly extended middle portion and an hollow lower portion; locking means in said head portions to lock said unit at different locations along said rear cross-bar and handle means to operate said locking means; longitudinally arranged and inclined braces connected at their lower ends to said lower portions of units and at their upper ends to other hand-operable locking means for connection of said braces to said front cross-bar and for displacement therealong; a threaded adjusting bar rotatably supported parallel to and near said rear cross-bar, and provided with hand-operable control means, said adjacent bar being screwably connected with the head portions of said side units for symmetrical displacement thereof along said rear cross-bar; rotary tool bearing shafts rotatably supported by and transversely arranged on the lower portions of said units; transmission means drivingly connecting said power take-off to said rotary tool bearing shafts, including middle shafts rotatably supported inside and on the middle portions of said units, bevel gear means in the lower portion of said units drivingly connecting the middle shafts to said rotary tool bearing shafts, other bevel gear means in the head portions of said units drivingly connecting said middle shafts to substantially horizontal drive shafts, a front drive shaft to drivingly connect said power take-off to bevel gear means in the head portion of the central unit, and extensible side drive shafts drivingly connecting each bevel gear means in said units' head portions to the corresponding gears in the adjacent units; torque-limiting devices for drivingly connecting said rotary tool bearing shafts to the respective rotary tools; and side-thrust opposing fin plate means fixedly connected to the lower portions of said units and located in vertical planes in direction of travel at least partly below the same and forwardly of said tools to cut into the ground so as to prevent displacement of said frame structure under the action of a torque produced by high resistance of the ground to forward movement of the tool of a side unit.

2. In a farm cultivating device as claimed in claim 1, wherein said rotary tool bearing shafts have end portions extended outside both side faces of said lower portions, and rotary tool bearing hubs supported about said extended portions and drivingly connected thereto by said torque-limiting devices.

3. In a farm cultivating device as claimed in claim 1, said working units each including a standard elongated hollow casing forming body having a head portion comprising one front face and two parallel opposite side faces, said front and side faces being provided with passages therethrough and with seat forming portions for alternately supporting bearing means and closure means.

4. A farm cultivating device of the type described, comprising, in combination, a frame structure having attachment means to removably connect said frame structure to a farm tractor of the type including a three-point lift implement and a power take-off, said frame structure consisting in a front cross-bar, in a rear cross-bar spaced from and parallel to said front cross-bar, in side bars connected to said cross-bars, and in an auxiliary structure supporting said attachment means; a plurality of elongated and downwardly directed working units including a central unit and side units, evenly spaced along said rear cross-bar and defining vertically extended spaces therebetween and beneath said rear cross-bar, each of said units comprising an hollow head portion adapted for connection to said rear cross-bar and for displacement therealong, an elongated downwardly extended hollow middle portion and an hollow lower portion; longitudinally arranged and inclined braces fixedly connected to said lower portions and adapted for connection to and for displacement along said front cross-bar; adjusting means for displacement of said side units along said rear cross-bar; rotary tool bearing shafts rotatably supported on the lower portions of said units; transmission means drivingly connecting said power take-off to said rotary tool bearing shafts, and including bevel gear means in said head portions of the central unit, means in said middle and lower portions of said units drivingly connecting said gears to said tool bearing shafts, and extensible drive shafts drivingly connecting said gears in any of said head portions to the corresponding gears in the adjacent units; torque-limiting devices for drivingly connecting said rotary shafts to the respective rotary tools; and side-thrust opposing fin plate means fixedly connected to said units' lower portions and located in vertical planes in direction of travel at least partly below the same and forwardly of said tools to cut into the ground so as to prevent displacement of said frame structure under the action of a torque produced by high resistance of the ground to forward movement of the toool of a side unit.

5. In a farm cultivating device as claimed in claim 4, wherein said rotary tool bearing shafts have end portions extended outside both side faces of said lower portions, and rotary tool bearing hubs supported about said extended portions of said rotary tool bearing shafts and drivingly connected thereto by said torque-limiting devices.

6. In a farm cultivating device as claimed in claim 4, said working units each including a standard elongated casing forming hollow body having a head portion comprising one front face and two parallel oppositely located side faces, said front and side faces being provided with passages therethrough and with seats adapted for alternately supporting bearing means and closure means.

7. A farm cultivating device of the type described, comprising, in combination, a frame structure having attachment means to removably connect said frame structure to a farm tractor of the type including a three-point lift implement and a power take-off, said frame structure consisting in a front cross-bar horizontally suspended and transversely arranged in respect to direction of travel, in a rear cross-bar spaced from and parallel to said front cross-bar, in side bars connected to said cross-bars at the ends thereof, and in a substantially pyramidal structure connected to said cross-bars and supporting said attachment means; a plurality of elongated and downwardly directed working units including a central unit and side units, evenly spaced along said rear cross-bar and defining vertically extended spaces therebetween and beneath said rear cross-bar, each of said units comprising a head portion adapted for connection to said rear cross-bar and for displacement therealong, an elongated downwardly extended middle portion and a lower portion; locking means in the respective head portions to lock said unit at differing locations along said rear cross-bar, and handle means to operate said locking means; longitudinally arranged and inclined braces connected at their lower ends to said lower portions of units and at their upper ends to other hand-operable locking means for connection of said braces to said front cross-bar and for displacement therealong; a threaded adjusting bar rotatably supported parallel to and adjacent said rear cross-bar and connected with the head portions of said side units for symmetrical displacement thereof along said rear cross-bar; rotary shafts rotatably supported by and transversely arranged on the lower portions of said units; transmission means drivingly connecting said power take-off to said rotary shafts, and including torque-limiting devices for drivingly connecting said rotary shafts to rotary tools; and side-thrust opposing fin plate means fixedly connected to said units' lower portions and located in vertical planes in direction of travel at least partly below the same and forwardly of said tools to cut into the ground so as to prevent displacement of said frame structure under the action of a torque produced by high resistance of the ground to forward movement of the tool of a side unit.

8. In a farm cultivating device as claimed in claim 7, wherein said rotary shafts have end portions extended outside both side faces of said lower portions, and rotary tool bearing hubs supported about said extended portions of said rotary shafts and drivingly connected thereto by said torque-limiting devices.

9. A farm cultivating device of the type described, comprising, in combination, a frame structure having attachment means to removably connect said frame structure to a farm tractor of the type including a lift implement and a power take-off, said frame structure consisting in a front cross-bar, in a rear cross-bar spaced from and parallel to said front cross-bar, in side bars connected to said cross-bars at the ends thereof, and a structure connected to said cross-bars and supporting said attachment means; a plurality of elongated and downwardly directed working units evenly spaced along said rear cross-bar and defining vertically extended spaces therebetween and beneath said rear cross-bar, each of said units comprising a hollow head portion adapted for connection to said rear cross-bar, an elongated hollow downwardly extended middle portion and a hollow lower portion; longitudinally arranged and inclined braces connected at their lower ends to said lower portions of said units and at their upper ends to said front cross-bar; rotary shafts rotatably supported by and transversely arranged on the lower portions of said units; transmission means drivingly connecting said power take-off to said rotary shafts, and including middle shafts rotatably supported on the middle portions of said units, bevel gear means on the lower portion of said units and drivingly connecting said middle shafts to said rotary shafts, other bevel gear means in said head portions for drivingly connecting said middle shafts to horizontal drive shafts, a front drive shaft for drivingly connecting said power take-off to bevel gear means in said head portion of said central unit and side drive shafts drivingly connecting each bevel gear means in said head portions to the corresponding gears in the adjacent units; torque-limiting devices for drivingly connecting said rotary shafts to rotary tools; and side-thrust opposing fin plate means fixedly connected to said units, lower portions and located in vertical planes in direction of travel at least partly below the same and forwardly of said tools to cut into the ground so as to prevent displacement of said frame structure under the action of a torque produced by high resistance of the ground to forward movement of the tool of a side unit.

10. In a farm cultivating device as claimed in claim 9, wherein said rotary shafts have end portions outwardly extended from both sides of said lower portions, and rotary tool bearing hub members arranged and supported about each of said rotary shafts' end portions and drivingly connected thereto by the said torque-limiting devices.

11. A farm cultivating device of the type described, comprising, in combination, a frame structure having attachment means to removably connect said frame structure to a farm tractor of the type including a lift implement and a power take-off, said frame structure consisting in cross-bars horizontally suspended and transversally arranged in respect to direction of travel, supporting said attachment means; a plurality of elongated and downwardly directed working units including a central unit and side units, evenly spaced along said rear cross-bars and defining vertically extended spaces therebetween and beneath said cross-bars, each of said units comprising a head portion adapted for connection to said cross-bars and for displacement therealong, and a lower portion; locking means to lock said units at differing locations along said cross-bars, adjusting means for displacement of said units along said rear cross-bars; rotary shafts rotatably supported on the lower portions of said units; transmission means drivingly connecting said power take-off to said rotary shafts, and including torque-limiting devices for drivingly connecting said rotary shafts to rotary tools; and side-thrust opposing fin plate means fixedly connected to said units' lower portions and located in vertical planes in direction of travel at least partly below the same and forwardly of said tools to cut into the ground so as to prevent displacement of said frame structure under the action of a torque produced by high resistance of the ground to forward movement of the tool of a side unit.

12. Power driven tillage implement comprising, in combination, frame means adapted to be attached to a tractor and including an elongated guide member extending transverse to the direction of travel; a plurality of cultivator units including at least two lateral units spaced from the central plane of symmetry of the implement, each unit including a support having an upper end attached to said guide member for movement along the same and a lower end adapted to be located in the region of the ground, a rotary cultivator tool mounted on each support, shaft means for driving each tool, transmission means connected to each shaft means and including a transverse transmission shaft, said transmission shafts being aligned and coupled to permit transverse movement of said units; drive shaft means for driving said coupled transmission shafts and thereby said tools, said drive shaft means being mounted on said frame means and adapted to be coupled to the power take-off shaft of the tractor, said units being transversely spaced to pass between rows of plants; a nut member secured to the upper ends of the supports of said lateral units, the nut members located on opposite sides of said central plane of symmetry having opposite thread; an elongated transversely extending spindle having threaded portions cooperating with said nut members; operating means for turning said spindle so as to move said lateral units simultaneously toward or away from said plane of symmetry; and a fin plate means secured to each support and having a side-thrust opposing plate portion located in a vertical plane below the lower end of the respective support to cut into the ground and extending forwardly of the respective tool in direction of travel and in a vertical plane so as to oppose transverse forces produced by greater resistance of the ground to one of said tools and to prevent displacement of said frame means.

13. Power driven tillage implement comprising, in combination, frame means adapted to be attached to a tractor and including an elongated guide member extending transverse to the direction of travel; a plurality of cultivator units including at least two lateral units spaced from the central plane of symmetry of the implement, each unit including a support having an upper end attached to said guide member for movement along the same and a lower end adapted to be located in the region of the ground, a rotary cultivator tool mounted on each support, shaft means for driving each tool, transmission means connected to each shaft means and including a transverse transmission shaft, said transmission shafts being aligned and coupled to permit transverse movement of said units; drive shaft means for driving said coupled transmission shafts and thereby said tools, said drive shaft means being mounted on said frame means and adapted to be coupled to the power take-off shaft of the tractor, said units being transversely spaced to pass between rows of plants; a nut member secured to the upper ends of the supports of said lateral units, the nut members located on opposite sides of said central plane of symmetry having opposite threads; an elongated transversely extending spindle having threaded portions cooperating with said nut members; operating means for turning said spindle so as to move said lateral units simultaneously toward or away from said plane of symmetry; locking means for clamping each of said supports to said guide member, at least the locking means associated with said lateral units being releasable to permit transverse adjustment of said lateral units; and a fin plate means secured to each support and having a side-thrust opposing plate portion located in a vertical plane below the lower end of the respective support to cut into the ground and extending forwardly of the respective tool in direction of travel and in a vertical plane so as to oppose transverse forces produced by greater resistance of the ground to one of said tools and to prevent displacement of said frame means.

14. Power driven tillage implement comprising, in combination, frame means adapted to be attached to a tractor and including an elongated guide bar extending transverse to the direction of travel; a plurality of cultivator units including at least two lateral units spaced from the central plane of symmetry of the implement, each unit including a casing having an upper end attached to said guide bar for movement along the same and a lower end adapted to be located in the region of the ground, a rotary cultivator tool mounted on each casing, shaft means for driving each tool, transmission means connected to each shaft means and including a transverse transmission shaft, said transmission shafts being aligned and coupled to permit transverse movement of said units; drive shaft means for driving said coupled transmission shafts and thereby said tools, said drive shaft means being mounted on said frame means and adapted to be coupled to the power take-off shaft of the tractor, said units being transversely spaced to pass between rows of plants; a nut member secured to the upper ends of the casings of said lateral units, the nut members located on opposite sides of said central plane of symmetry having opposite thread; an elongated transversely extending spindle having threaded portions cooperating with said nut members; operating means for turning said spindle so as to move said lateral units simultaneously toward or away from said plane of symmetry; locking means for clamping each of said casings to said guide member, at least the locking means associated with said lateral units being releasable to permit transverse adjustment of said lateral units; and a fin plate means secured to each casing and having a side-thrust opposing plate portion located in a vertical plane below the lower end of the respective casing to cut into the ground and extending forwardly of the respective tool in direction of travel and in a vertical plane so as to oppose transverse forces produced by greater resistance of the ground to one of said tools and to prevent displacement of said frame means.

15. Power driven tillage implement comprising, in combination, frame means adapted to be attached to a tractor and including an elongated guide bar extending transverse to the direction of travel; a plurality of cultivator units including at least two lateral units spaced from the central plane of symmetry of the implement, each unit including a casing having an upper end attached to said guide bar for movement along the same and a lower end adapted to be located in the region of the ground, a rotary cultivator tool mounted on each casing, shaft means for driving each tool, transmission means connected to each shaft means and including a transverse transmission shaft, said transmission shafts being aligned and coupled to permit transverse movement of said units; drive shaft means for driving said coupled transmission shafts and thereby said tools, said drive shaft means being mounted on said frame means and adapted to be coupled to the power take-off shaft of the tractor, each transmission means including a torque-limiting clutch comprising two clutch members having engaging shoulders, one of said clutch members being movable in axial direction to a releasing position in which said shoulders are axially spaced, and a spring means opposing movement of said movable clutch member so that each clutch releases at a predetermined maximum torque, said units being transversely spaced to pass between rows of plants; a nut member secured to the upper ends of the casings of said lateral units, the nut members located on opposite sides of said central plane of symmetry having opposite thread; an elongated transversely extending spindle having threaded portions cooperating with said nut members; operating means for turning said spindle so as to move said lateral units simultaneously toward or away from said plane of symmetry; locking means for clamping each of said casings to said guide member, at least the locking means associated with said lateral units being releasable to permit transverse adjustment of said lateral units; and a fin plate means secured to each casing and having a side-thrust opposing plate portion located in a vertical plane below the lower end of the respective casing to cut into the ground and extending forwardly of the respective tool in direction of travel and in a vertical plane so as to oppose transverse forces produced by greater resistance of the ground to one of said tools and to prevent displacement of said frame means.

(References on following page)

References Cited in the file of this patent

UNITED STATES PATENTS

| | | |
|---|---|---|
| 1,476,917 | Patitz | Dec. 11, 1923 |
| 2,070,830 | Gravely | Feb. 16, 1937 |
| 2,223,002 | Ferguson | Nov. 26, 1940 |
| 2,361,798 | Smith | Oct. 31, 1944 |
| 2,616,348 | Ariens | Nov. 4, 1952 |
| 2,741,173 | White | Apr. 10, 1956 |

FOREIGN PATENTS

| | | |
|---|---|---|
| 420,050 | Great Britain | Nov. 23, 1934 |

OTHER REFERENCES

Publication: "Farm Implement and Machinery Review"; March 1, 1955; vol. 80; No. 959; pages 1968, 1969, published in Great Britain.